US010759282B2

(12) United States Patent
Suzuki (10) Patent No.: US 10,759,282 B2
(45) Date of Patent: Sep. 1, 2020

(54) VEHICLE TURNING CONTROL DEVICE

(71) Applicant: NTN CORPORATION, Osaka (JP)

(72) Inventor: Yuta Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 162 days.

(21) Appl. No.: 16/022,217

(22) Filed: Jun. 28, 2018

(65) Prior Publication Data

US 2018/0304768 A1   Oct. 25, 2018

Related U.S. Application Data

(63) Continuation of application No. PCT/JP2017/000111, filed on Jan. 5, 2017.

(30) Foreign Application Priority Data

Jan. 8, 2016   (JP) .................................. 2016-002583

(51) Int. Cl.
*B60L 15/20* (2006.01)
*B60W 40/114* (2012.01)
(Continued)

(52) U.S. Cl.
CPC .................. *B60L 15/20* (2013.01); *B60L 9/18* (2013.01); *B60T 8/17551* (2013.01);
(Continued)

(58) Field of Classification Search
CPC ......... B60L 15/20; B60L 9/18; B60T 8/17551
See application file for complete search history.

(56) References Cited

U.S. PATENT DOCUMENTS 5,711,023 A   1/1998   Eckert et al.
7,637,331 B2  12/2009  Takeuchi et al.
(Continued)

FOREIGN PATENT DOCUMENTS

JP   11-91608      4/1999
JP   2005-41386    2/2005
(Continued)

OTHER PUBLICATIONS

International Search Report dated Mar. 28, 2017 in corresponding International Patent Application No. PCT/JP2017/000111.
(Continued)

*Primary Examiner* — Ramsey Refai (57) ABSTRACT

Provided is a vehicle turning control device that can stabilize a vehicle by performing yaw moment control considering a tire grip limit and gives no uncomfortable feeling to a driver even if the control is switched from the yaw moment control to control for stabilizing the attitude of the vehicle. The vehicle turning control device includes a target yaw rate calculation module (25), a yaw moment calculation module (27), a yaw rate deviation calculation module (29), a road surface frictional coefficient calculation module (24), and a control gain calculation module (26). The control gain calculation module (26) causes a yaw response characteristic used in the target yaw rate calculation module (25) to approach a reference yaw response characteristic from a predetermined yaw response characteristic as a calculated yaw rate deviation increases or as an estimated road surface frictional coefficient decreases.

16 Claims, 9 Drawing Sheets

(51) Int. Cl.
  *B60L 9/18* (2006.01)
  *B60W 30/045* (2012.01)
  *B60W 40/068* (2012.01)
  *B60T 8/1755* (2006.01)
  *B62D 9/00* (2006.01)

(52) U.S. Cl.
  CPC ....... *B60T 8/17555* (2013.01); *B60W 30/045* (2013.01); *B60W 40/068* (2013.01); *B60W 40/114* (2013.01); *B62D 9/002* (2013.01); *B60T 2210/12* (2013.01); *Y02T 10/7275* (2013.01)

(56) References Cited

U.S. PATENT DOCUMENTS

| | | | | |
|---|---|---|---|---|
| 7,643,922 | B2* | 1/2010 | Motoyama | B60W 30/045 701/36 |
| 9,296,374 | B2* | 3/2016 | Yamakado | B60L 3/102 |
| 9,308,912 | B2* | 4/2016 | Maeda | B60W 20/40 |
| 9,487,232 | B2 | 11/2016 | Ohmura et al. | |
| 9,604,636 | B2* | 3/2017 | Yokota | B60W 30/045 |
| 9,610,925 | B2* | 4/2017 | Nomura | B60T 8/17551 |
| 9,834,110 | B2* | 12/2017 | Nobumoto | B60L 11/1861 |
| 2007/0289804 | A1 | 12/2007 | Takeuchi et al. | |
| 2015/0175196 | A1 | 6/2015 | Ohmura et al. | |
| 2019/0275994 | A1* | 9/2019 | Zhao | B60L 7/18 |

FOREIGN PATENT DOCUMENTS

| | | |
|---|---|---|
| JP | 2005-324743 | 11/2005 |
| JP | 2006-123611 | 5/2006 |
| JP | 2006-321271 | 11/2006 |
| JP | 2010-179844 | 8/2010 |
| JP | 2015-120415 | 7/2015 |

OTHER PUBLICATIONS

English Translation by WIPO of the International Preliminary Report on Patentability dated Jul. 19, 2018 in corresponding International Patent Application No. PCT/JP2017/000111, 6 pgs.

Extended European Search Report dated Jul. 26, 2019 in corresponding European Patent Application No. 17735977.5.

* cited by examiner

Fig. 11C

VEHICLE TURNING CONTROL DEVICE

CROSS REFERENCE TO THE RELATED APPLICATION

This application is a continuation application, under 35 U.S.C. § 111(a), of international application No. PCT/JP2017/000111, filed Jan. 5, 2017, which claims Convention priority to Japanese patent application No. 2016-002583, filed Jan. 8, 2016, the entire disclosure of which is herein incorporated by reference as a part of this application.

BACKGROUND OF THE INVENTION

Field of the Invention

The present invention relates to a vehicle turning control device that improves vehicle turning performance and stabilizes the vehicle attitude at a place having a low road surface frictional coefficient, or the like.

Description of Related Art

Conventionally, yaw angle model following control for improving turning performance using a braking/driving torque difference between right and left wheels, and yaw moment control such as skid prevention control device (Electronic Stability Control (ESC)) for stabilizing the vehicle attitude, have been proposed.

For example, a control device is proposed which improves turning performance by yaw moment control using feedforward control and feedback control in combination and which switches from the yaw moment control to vehicle behavior stabilization control as the turning degree approaches the limit (Patent Document 1).

RELATED DOCUMENT

Patent Document

[Patent Document 1] JP Laid-open Patent Publication No. 2015-120415

SUMMARY OF THE INVENTION

In the yaw moment control of Patent Document 1, tire grip is not taken into consideration, and therefore the following problem arises. For example, if yaw moment control for improving turning performance is performed when the road surface frictional coefficient of the travelling space is low, tire grip exceeds the limit and the vehicle becomes unstable.

If the turning degree approaches the limit and the control is switched to vehicle behavior stabilization control from the yaw moment control, when the yaw moment control for improving turning performance is switched to the vehicle behavior stabilization control, the vehicle turning characteristic with respect to steering varies between before and after the switching. Therefore, uncomfortable feeling might be given to a driver.

An object of the present invention is to provide a vehicle turning control device that can stabilize a vehicle by performing yaw moment control considering the tire grip limit and gives no uncomfortable feeling to the driver even if the control is switched from the yaw moment control to control for stabilizing the vehicle attitude.

In the following description, the reference characters in the embodiments are used for convenience sake in order to facilitate the understanding.

A vehicle turning control device according to one aspect of the present invention is a vehicle turning control device for controlling a turning characteristic of a vehicle 1, the vehicle including braking/driving sources 4 for independently control braking/driving torques (braking torques and/or driving torques) applied to a plurality of wheels 2, a vehicle speed detection device 18 for detecting a vehicle speed, and a steering angle detection device 19 for detecting a steering angle, the vehicle turning control device including: a target yaw rate calculation module 25 configured to calculate a target yaw rate for the vehicle based on a yaw response characteristic, with respect to the vehicle speed detected by the vehicle speed detection device 18 and the steering angle detected by the steering angle detection device 19; a yaw moment calculation module 27 configured to calculate the braking/driving torques developed at the plurality of wheels 2 based on the target yaw rate calculated by the target yaw rate calculation module 25, so as to calculate a yaw moment predicted to act on the vehicle 1; a yaw rate deviation-and/or-road surface friction calculation module 40 including one or both of a yaw rate deviation calculation module 29 configured to calculate a yaw rate deviation, from a difference between the target yaw rate and an actual yaw rate detected by a yaw rate detection device 20 provided to the vehicle 1, and a road surface frictional coefficient calculation module 24 configured to estimate a road surface frictional coefficient; and a yaw response characteristic changing module (control gain calculation module 26) configured to cause the yaw response characteristic used in the target yaw rate calculation module 25 so as to approach a reference yaw response characteristic from a predetermined yaw response characteristic different from the reference yaw response characteristic, as the yaw rate deviation calculated by the yaw rate deviation calculation module 29 increases or as the road surface frictional coefficient estimated by the road surface frictional coefficient calculation module 24 decreases.

The "turning characteristic" indicates not only a characteristic of ease in turning of the vehicle but also stability of the vehicle attitude during turning of the vehicle.

The "reference yaw response characteristic" refers to the yaw response characteristic inherent in the vehicle, i.e., a yaw response characteristic based on performance and structure of the vehicle, which is independent from the external environment.

The "predetermined yaw response characteristic" is determined by experiment and/or simulation.

In this configuration, the target yaw rate calculation module 25 calculates the target yaw rate for the vehicle, based on the yaw response characteristic, with respect to the vehicle speed and the steering angle. The yaw moment calculation module 27 calculates braking/driving torques developed at the plurality of wheels 2 based on the target yaw rate, so as to calculate a yaw moment acting on the vehicle 1. As the calculated yaw rate deviation increases or as the estimated road surface frictional coefficient decreases, the yaw response characteristic changing module 26 causes the yaw response characteristic to approach the reference yaw response characteristic from the predetermined yaw response characteristic different from the reference yaw response characteristic. In this way, by changing the yaw response characteristic in accordance with the road surface frictional coefficient or the yaw rate deviation, it is possible to suppress change in the attitude of the vehicle 1 due to the yaw moment control. In addition, even if the control is switched from the yaw moment control to the control for stabilizing the attitude of the vehicle 1, it is possible to prevent uncomfortable feeling from being given to the driver.

The yaw response characteristic changing module (control gain calculation module 26) may determine a control gain for the yaw response characteristic used in the target yaw rate calculation module 25, in accordance with one or both of the yaw rate deviation and the road surface frictional coefficient.

The yaw response characteristic changing module (control gain calculation module 26) may adjust the yaw response characteristic used in the target yaw rate calculation module 25 to the reference yaw response characteristic, when the road surface frictional coefficient is smaller than a road surface frictional coefficient threshold value or when the yaw rate deviation is greater than a yaw rate deviation threshold value. The threshold values are determined by experiment and/or simulation.

In this configuration, change in the attitude of the vehicle due to yaw moment control is limited to almost zero, when the road surface frictional coefficient is smaller than the road surface frictional coefficient threshold value and/or when the yaw rate deviation is greater than the yaw rate deviation threshold value. Thus, the attitude of the vehicle 1 can be prevented from becoming unstable.

The yaw response characteristic changing module (control gain calculation module 26) may be configured such that, when the yaw response characteristic used in the target yaw rate calculation module 25 is changed from the reference yaw response characteristic to the predetermined yaw response characteristic, an amount of change in the yaw response characteristic per time is smaller than when the yaw response characteristic is changed from the predetermined yaw response characteristic to the reference yaw response characteristic.

In this case, when the yaw response characteristic is changed from the predetermined yaw response characteristic to the reference yaw response characteristic, the attitude of the vehicle 1 can be stabilized immediately, and when the yaw response characteristic is changed from the reference yaw response characteristic to the predetermined yaw response characteristic, uncomfortable feeling can be prevented from being given to the driver.

The yaw response characteristic used in the target yaw rate calculation module 25 may be represented by a calculation expression of a second-order lag system of the target yaw rate relative to an actual steering angle, and the yaw response characteristic may be changed by changing a gain of a natural frequency in a yaw direction and/or a gain of an attenuation coefficient in the yaw direction included in the calculation expression. In this way, by representing the yaw response characteristic used in the target yaw rate calculation module 25 by a general calculation expression of a second-order lag system, the calculation expression can be simplified. In addition, the natural frequency and the attenuation coefficient in the yaw direction can be adjusted individually.

The road surface frictional coefficient calculation module 24 may estimate the road surface frictional coefficient from a magnitude of an actual lateral acceleration detected by a lateral acceleration detection device 21 provided to the vehicle 1 when a deviation between a target lateral acceleration and the actual lateral acceleration is greater than a predetermined value. The predetermined value is determined by experiment and/or simulation. In this configuration, the road surface frictional coefficient can be estimated using an existing lateral acceleration detection device 21, and therefore the control device is obtained at low cost.

The vehicle turning control device may further include a vehicle attitude stabilization control device 15 configured to perform control for stabilizing an attitude of the vehicle 1. The vehicle attitude stabilization control device 15 may use the target yaw rate calculated by the target yaw rate calculation module 25, for the control for stabilizing the attitude of the vehicle 1. In this case, even if the control is switched from the yaw moment control to the control for stabilizing the attitude of the vehicle 1, the same target yaw rate as that used in the yaw moment control is used and thus the turning characteristic of the vehicle 1 with respect to steering stays unchanged. Therefore, no uncomfortable feeling is given to the driver.

The braking/driving sources 4 may be electric motors 4 configured to drive the respective wheels 2. In this case, it is possible to control braking/driving torques and generate a yaw moment, by only the electric motors 4.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
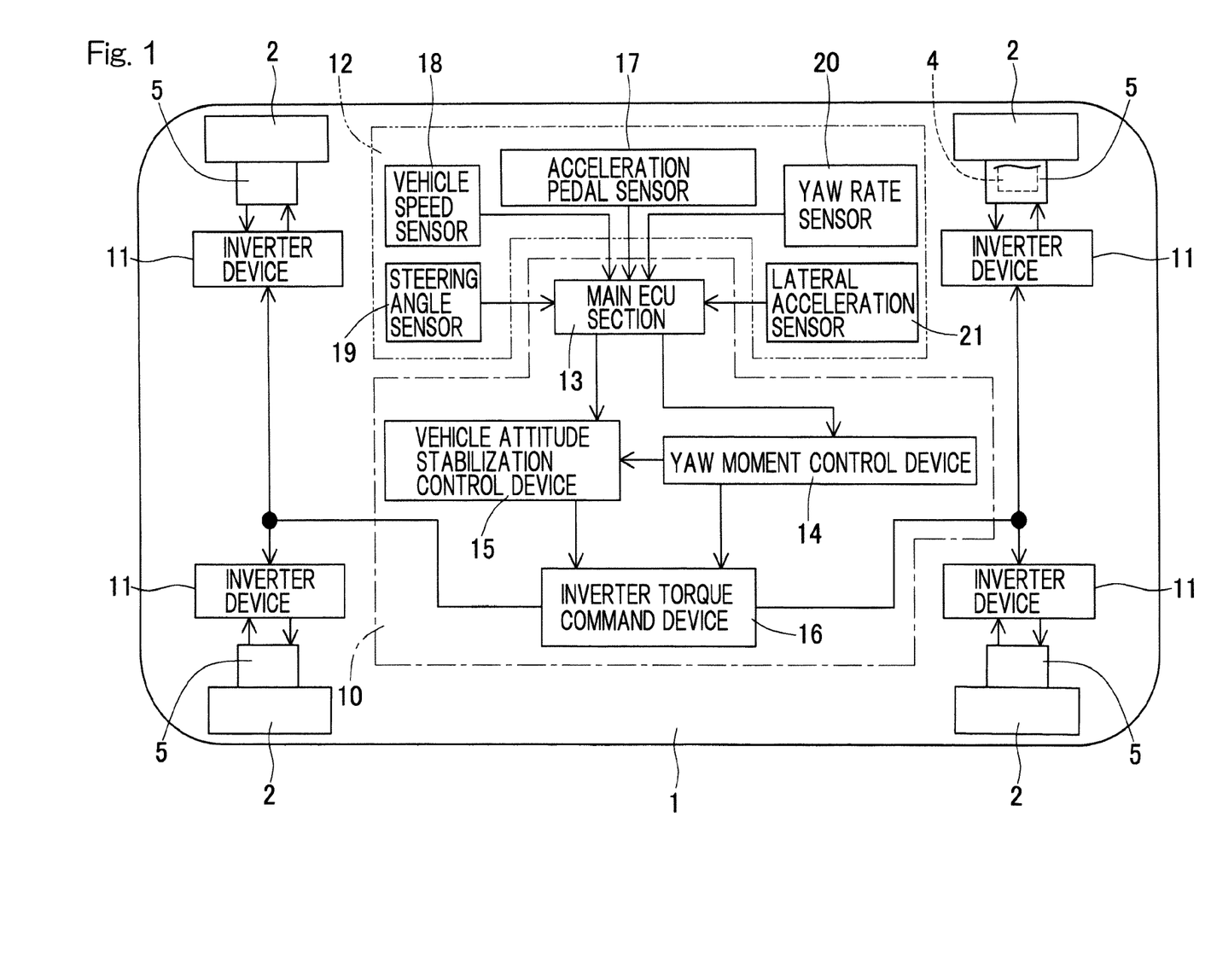
FIG. 1 is a system configuration diagram showing the conceptual configuration of a vehicle turning control device according to the first embodiment of the present invention.

A vehicle turning control device according to the first embodiment of the present invention will be described with reference to FIGS. 1 to 8. As shown in FIG. 1, an example in which a vehicle 1 provided with the turning control device is a vehicle of four-wheel independent driven type having in-wheel motor driving devices 5 for all four wheels, will be described. In this vehicle 1, wheels 2, 2 that are right and left rear wheels and wheels 2, 2 that are right and left front wheels are independently driven by electric motors 4 as braking/driving sources in the respective in-wheel motor driving devices 5.

Figure 2:
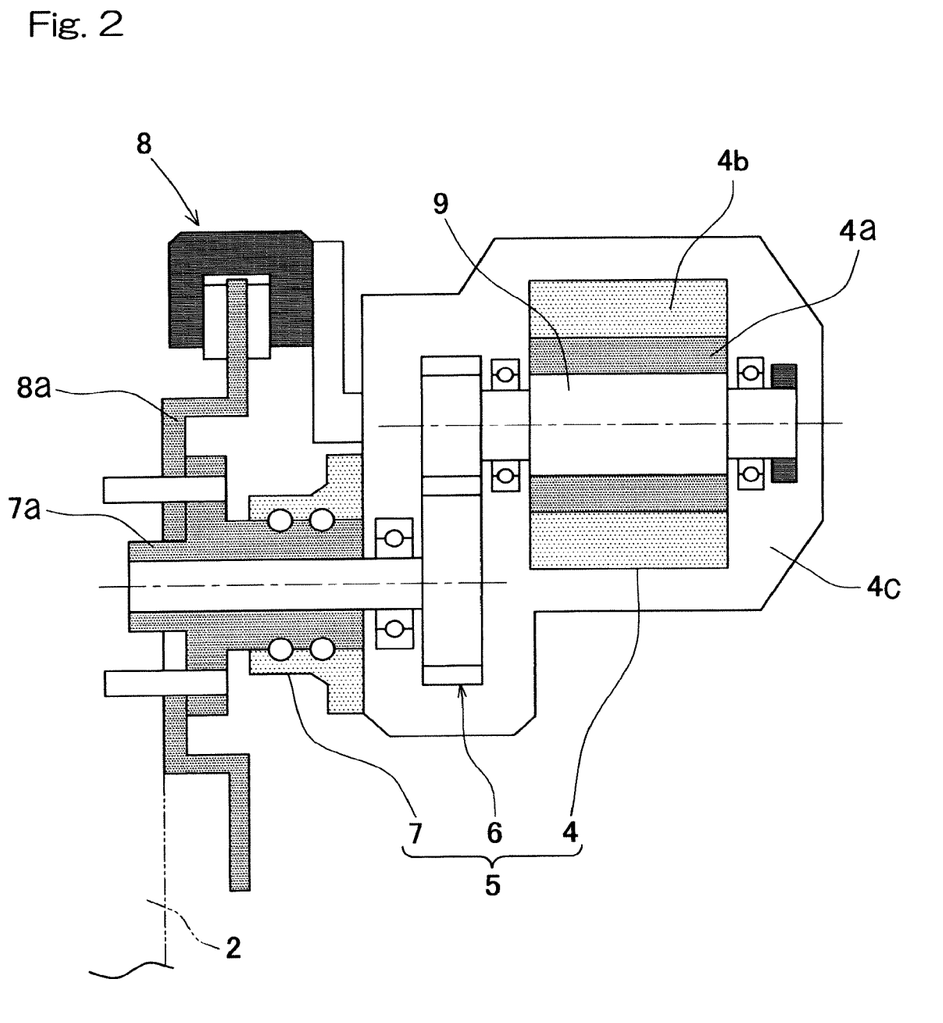
FIG. 2 is a sectional view showing an example of an in-wheel motor driving device for a vehicle shown in FIG. 1.

As shown in FIG. 2, each in-wheel motor driving device 5 has the electric motor 4, a speed reducer 6, and a wheel bearing 7. The speed reducer 6 and the wheel bearing 7 are partially or entirely provided inside the wheel 2. Rotation of the electric motor 4 is transmitted to the wheel 2 via the speed reducer 6 and the wheel bearing 7. A brake rotor 8a composing a frictional brake device 8 is fixed to a flange portion of a hub ring 7a of the wheel bearing 7. The brake rotor 8a rotates integrally with the wheel 2. The electric motor 4 is, for example, an interior permanent magnet synchronous motor, having permanent magnets embedded in a core portion of a rotor 4a. The electric motor 4 is a motor in which a radial gap is provided between a stator 4b, fixed to a housing 4c, and the rotor 4a, attached to a rotary output shaft 9.

In FIG. 1, a control system will be described. The turning control device of the vehicle 1 includes an ECU (Electric Control Unit) 10, a plurality of (in this example, four) inverter devices 11, provided for the respective electric motors 4, and sensors 12. The ECU 10 includes a main ECU section 13 having a general function, a yaw moment control device 14, a vehicle attitude stabilization control device 15, and an inverter torque command device 16. The ECU 10 is configured from a computer such as a microcomputer, a program executed by the computer, various electronic circuit, and the like. The ECU 10 and the inverter devices 11 are connected to each other via an in-vehicle communication network such as control area network (CAN).

The main ECU section 13 has, as a basic configuration thereof, a function for performing integrated control and cooperative control for the entire vehicle, and a braking/driving command generation function. The braking/driving command generation function is a function of generating torque command values to be distributed to the respective electric motors 4, from an acceleration command value which is a command value of operation amount detected by an acceleration pedal sensor 17 provided to an acceleration pedal (not shown). When the driver operates the acceleration pedal to command for driving, the acceleration command value is supplied from the acceleration pedal sensor 17 to the main ECU section 13 in accordance with the operation amount of the acceleration pedal.

An acceleration torque command value from the main ECU section 13 is sent to each inverter device 11 via the yaw moment control device 14 and the like. Each inverter device 11 is configured so as to convert DC power of a battery (not shown) to AC power for driving the electric motor 4, and has a control unit (not shown) for controlling the output thereof, thereby controlling the corresponding electric motor 4 in accordance with the torque command value distributed for each wheel 2. Each inverter device 11 includes a power circuit unit (not shown) such as a bridge circuit of switching elements for performing conversion to AC power, and a control unit (not shown) for controlling the power circuit unit.

The sensors 12 includes the acceleration pedal sensor 17, a vehicle speed sensor (vehicle speed detection device) 18 for detecting the vehicle speed, a steering angle sensor (steering angle detection device) 19 for detecting the steering angle, a yaw rate sensor (yaw rate detection device) 20 for detecting the yaw rate, and a lateral acceleration sensor (lateral acceleration detection device) 21 for detecting the lateral acceleration. The steering angle sensor 19 is, for example, a sensor for detecting the steering angle of a steering wheel or the like (not shown). The steering angle from the steering angle sensor 19, the vehicle speed from the vehicle speed sensor 18, the actual lateral acceleration from the lateral acceleration sensor 21, and the actual yaw rate from the yaw rate sensor 20 are supplied to the main ECU section 13. These values are supplied from the main ECU section 13 to the yaw moment control device 14 and the vehicle attitude stabilization control device 15.

Figure 3:
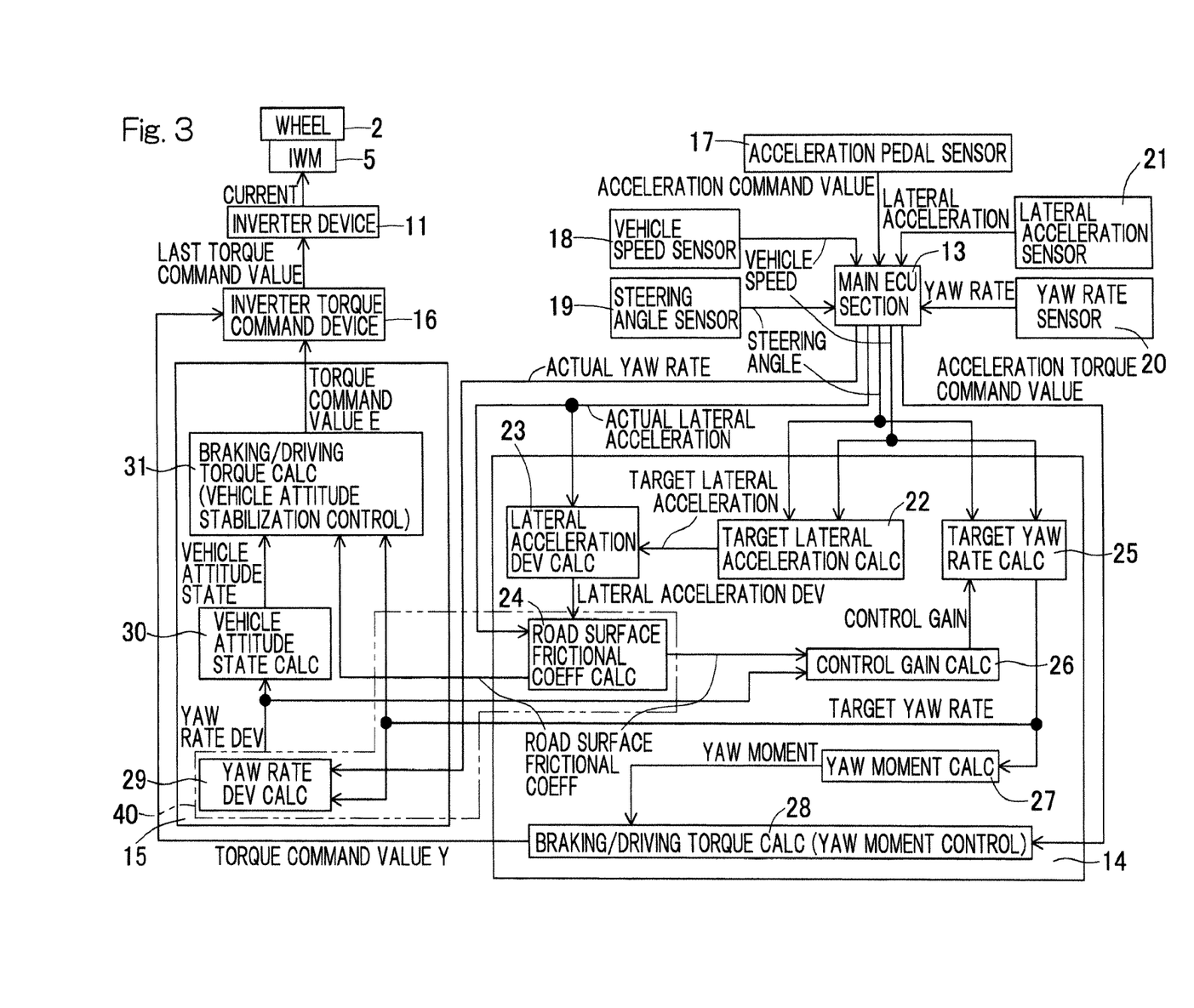
FIG. 3 is a block diagram showing a specific example of a part of the turning control device shown in FIG. 1.

As shown in FIG. 3, the yaw moment control device 14 includes a target lateral acceleration calculation module 22, a lateral acceleration deviation calculation module 23, a road surface frictional coefficient calculation module 24, a target yaw rate calculation module 25, a control gain calculation module (yaw response characteristic changing module) 26, a yaw moment calculation module 27, and a braking/driving torque calculation module 28. The road surface frictional coefficient calculation module 24 composes a yaw rate deviation-and/or-road surface friction calculation module 40, together with a yaw rate deviation calculation module 29 of the vehicle attitude stabilization control device 15 described later.

The vehicle speed, the steering angle, the actual lateral acceleration, and the acceleration torque command value from the acceleration pedal sensor 17, are supplied from the main ECU section 13 to the yaw moment control device 14.

Figure 4:
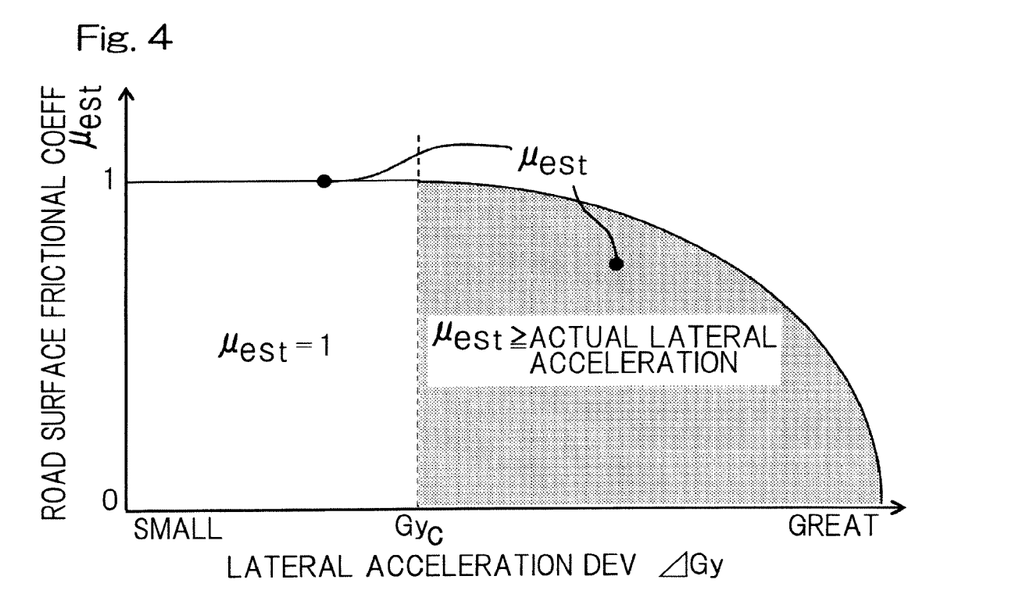
FIG. 4 shows the relationship between a lateral acceleration deviation and a road surface frictional coefficient in the turning control device shown in FIG. 1.

The target lateral acceleration calculation module 22 calculates a target lateral acceleration from the vehicle speed, the steering angle, and vehicle parameters such as vehicle mass and wheelbase. The lateral acceleration deviation calculation module 23 calculates a lateral acceleration deviation, from a difference between the target lateral acceleration calculated by the target lateral acceleration calculation module 22 and the actual lateral acceleration supplied from the main ECU section 13. The road surface frictional coefficient calculation module 24 calculates a road surface frictional coefficient in accordance with the following expressions (1), (2). FIG. 4 shows the relationship between the lateral acceleration deviation and the road surface frictional coefficient in the turning control device.

As shown in FIG. 3 and FIG. 4, if the lateral acceleration deviation obtained by the lateral acceleration deviation calculation module 23 is equal to or smaller than a certain lateral acceleration deviation threshold value $Gy_c$, the road surface frictional coefficient calculation module 24 sets a road surface frictional coefficient $\mu_{est}$ to 1, and if the lateral acceleration deviation is greater than the lateral acceleration deviation threshold value $Gy_c$, the road surface frictional coefficient calculation module 24 calculates the road surface frictional coefficient $\mu_{est}$ from an actual lateral acceleration $Gy_{act}$. Here, the target lateral acceleration is defined as $Gy_{ref}$, the actual lateral acceleration (G) is defined as $Gy_{act}$, the road surface frictional coefficient is defined as $\mu_{est}$, the actual lateral acceleration (m/s$^2$) is defined as $G_y$, a front-rear force is defined as Fx, a lateral force is defined as Fy, an up-down force is defined as Fz, the vehicle weight is defined as m, and the gravitational acceleration is defined as g.

In an equilibrium expression $$(\mu_{est}Fz)^2 = Fx^2 + Fy^2 \qquad (1)'$$

if Fx is equal to 0, the following expression is obtained:

$$\mu_{est}|Fz| = |Fy| \qquad (2)'$$

From an expression $$|Fy| = m|Gy| \qquad (3)', \text{ and}$$

expression (2)',
the following expression is obtained:

$$\mu_{est}|Fz| = m|Gy| \qquad (4)'$$

Thus, $\mu_{est}$ is represented as follows:

$$\mu_{est} = |Gy_{act}| = |Gy|/g \qquad (5)'$$

From the above, the road surface frictional coefficient is estimated as follows:

$$\text{If } |Gy_{ref}| - |Gy_{act}| \leq |Gy_c|, \mu_{est} = 1 \qquad (1)$$

$$\text{If } |Gy_{ref}| - |Gy_{act}| > |Gy_c|, \mu_{est} \geq |Gy_{act}| \qquad (2).$$

As shown in FIG. 3, the target yaw rate calculation module 25 calculates a yaw rate predicted to occur in the vehicle, from a predetermined yaw response characteristic, with respect to at least the vehicle speed and the steering angle. Specifically, the target yaw rate calculation module 25 performs calculation using a transfer function of a second-order lag system or a time lag system of second order of a target yaw rate r(s) relative to an actual steering angle δ(s), shown in expression (3), for example.

[Mathematical 1]

$$\frac{r(s)}{\delta(s)} = G_\delta^r(0) \frac{(\alpha\omega_n)^2(1 + T_r s)}{(\alpha\omega_n)^2 + 2\left(\frac{\zeta}{\lambda}\right)(\alpha\omega_n)s + s^2} \qquad (3)$$

In expression (3), $G\delta^r(0)$ is a yaw angular velocity gain constant (yaw rate gain constant), $\omega_n$ is a natural frequency in the yaw direction, $\zeta$ is an attenuation coefficient in the yaw direction, Tr is a yaw angular velocity time constant (yaw rate time constant), s is the Laplace operator, α is a control gain of the natural frequency $\omega_n$, and λ is a control gain of the attenuation coefficient $\zeta$. The yaw angular velocity gain constant $G\delta^r(0)$, the natural frequency $\omega_n$ in the yaw direction, the attenuation coefficient $\zeta$ in the yaw direction, and the yaw angular velocity time constant Tr are calculated from the vehicle speed and vehicle parameters such as vehicle mass and wheelbase.

When the control gain α of the natural frequency $\omega_n$ or the control gain λ of the attenuation coefficient $\zeta$ is set at greater than 1, rise time of the target yaw rate becomes shorter (i.e., quick responsiveness for the target yaw rate is enhanced), and when the control gains α and λ are set at 1, the yaw response characteristic becomes that the vehicle has, that is, the yaw response characteristic inherent in the vehicle (a reference yaw response characteristic).

In this example, the control gain calculation module 26 calculates the control gains α, λ in accordance with one or both of the road surface frictional coefficient calculated by the road surface frictional coefficient calculation module 24 and a yaw rate deviation calculated by the yaw rate deviation calculation module 29 described later. As described below, with reference to FIG. 5 and FIG. 6, the case of the control gain α of the natural frequency $\omega_n$ will be described as an example, but the control gain λ, of the attenuation coefficient $\zeta$ also has substantially the same characteristic as the control gain α, and therefore the description of the control gain λ is omitted.

Figure 5:
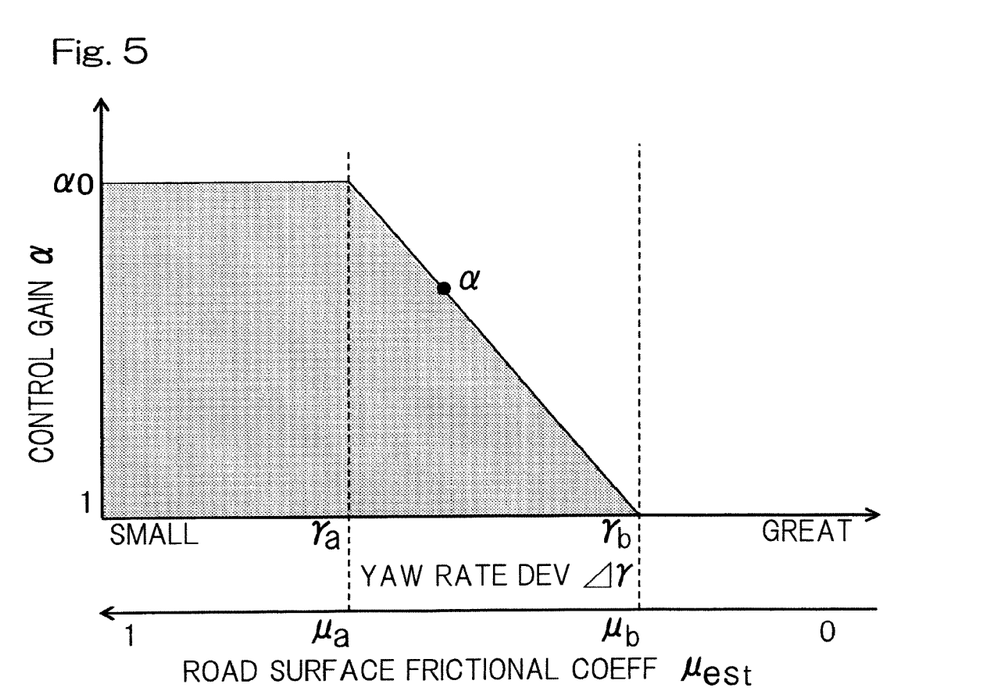
FIG. 5 shows the relationship between the control gain and each of a yaw rate deviation and the road surface frictional coefficient in the turning control device shown in FIG. 1.

As shown in FIG. 5, two threshold values may be provided for the road surface frictional coefficient and the yaw rate deviation. For example, if the road surface frictional coefficient becomes smaller than the first road surface frictional coefficient threshold value $\mu_a$ or the yaw rate deviation becomes greater than the first yaw rate deviation threshold value $r_a$, the control gain calculation module 26 causes the control gain α to approach 1 from the initial value (predetermined yaw response characteristic) $\alpha_0$. That is, the control gain calculation module 26 sets a value calculated by $\alpha = -((\alpha_0-1)/(r_b-r_a))(r-r_a)+\alpha_0$ or $\alpha = -((\alpha_0-1)/(\mu_b-\mu_a)(\mu-\mu_a)+\alpha_0$, as the control gain α. On the other hand, if the road surface frictional coefficient becomes smaller than the second road surface frictional coefficient threshold value $\mu_b$ or the yaw rate deviation becomes greater than the second yaw rate deviation threshold value $r_b$, the control gain calculation module 26 causes the control gain α to approach the initial value $\alpha_0$ from 1.

Here, as described later, the amount of change in the control gain α per time when the control gain α is returned from 1 to the initial value $\alpha_0$ is small, and therefore the control gain calculation module 26 sets a value calculated by $\alpha = -((\alpha_0-1)/(r_b-r_c))(r-r_c)+\alpha_0$ or a value calculated by $\alpha = -((\alpha_0-1)/(\mu_b-\alpha_c))(\mu-\mu_c)+\alpha_0$, as the control gain α, wherein the yaw rate deviation value $r_c$ satisfies $r_c > r_a$, and the road surface frictional coefficient value $\mu_c$ satisfies $\mu_c < \mu_a$. If the road surface frictional coefficient is smaller than the second road surface frictional coefficient threshold value $\mu_b$ or the yaw rate deviation is greater than the second yaw rate deviation threshold value $r_b$, the control gain calculation module 26 sets 1 as the control gain α. If the road surface frictional coefficient is equal to or greater than the first road surface frictional coefficient threshold value $\mu_a$ or the yaw rate deviation is equal to or smaller than the first yaw rate deviation threshold value $r_a$, the control gain calculation module 26 sets the initial value $\alpha_0$ as the control gain α.

Figure 6:
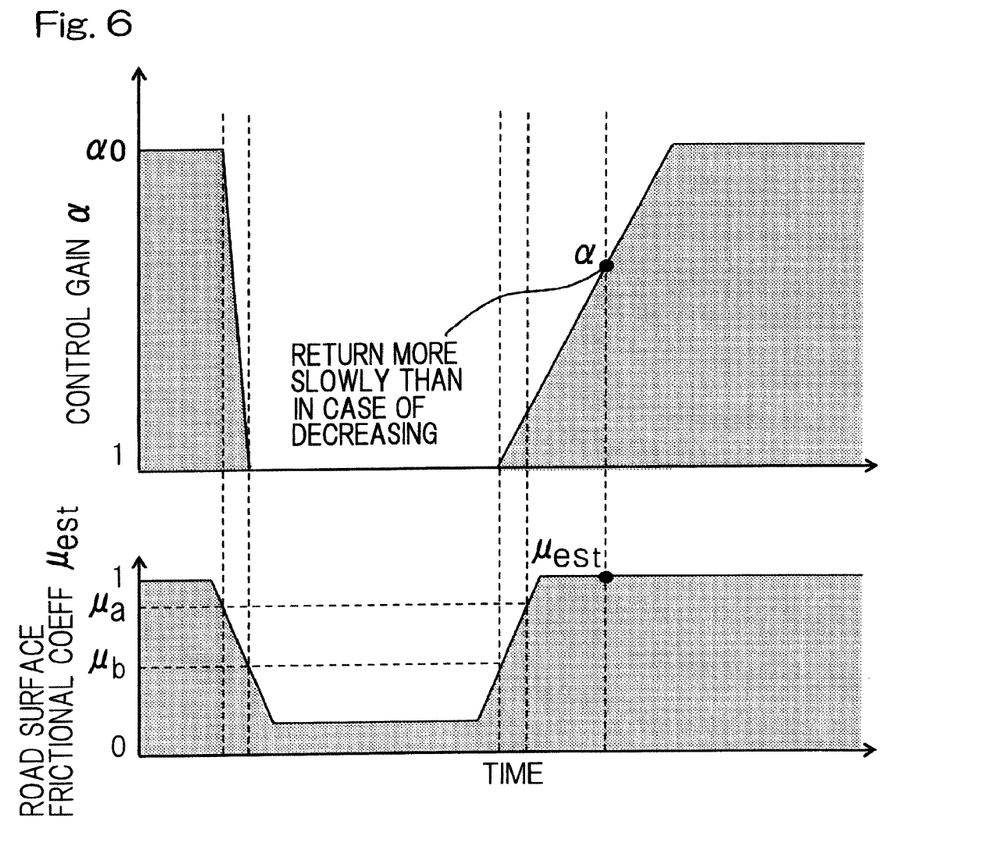
FIG. 6 shows an example of transition of the control gain in the turning control device shown in FIG. 1.

The control gain calculation module 26 in FIG. 3 is configured such that, when changing the yaw response characteristic from the yaw response characteristic inherent in the vehicle to the predetermined yaw response characteristic, the amount of change in the yaw response characteristic per time is smaller than when changing the yaw response characteristic from the predetermined yaw response characteristic to the yaw response characteristic inherent in the vehicle. Specifically, as shown in FIG. 6, as compared to the case where the control gain α decreases from the initial value $α_0$, which forms the predetermined yaw response characteristic, to 1, which forms the yaw response characteristic inherent in the vehicle, the amount of change per time is smaller when the control gain α is returned from 1 to the initial value $α_0$. That is, the control gain α is changed more gradually.

At a place with a low road surface frictional coefficient, the tire grip force is likely to be greatly reduced, and therefore the control gain calculation module 26 (FIG. 3) immediately decreases the control gain α, to decrease the braking/driving torque in the yaw moment control. As shown in FIG. 6, at a place with a high road surface frictional coefficient, the tire grip force is restored, and therefore the control gain α is gradually returned to the initial value $α_0$, thereby increasing the braking/driving torque in the yaw moment control. By the gradual return, no uncomfortable feeling is given to the driver.

As shown in FIG. 3, the yaw moment calculation module 27 calculates a braking/driving torque which is a braking torque or a driving torque for each wheel 2 on the basis of the target yaw rate calculated by the target yaw rate calculation module 25, thereby calculating a yaw moment predicted to act on the vehicle.

The yaw moment calculation module 27 performs calculation using a transfer function of a third-order lag system or a time lag system of third order of a yaw moment $M_z(s)$ relative to the actual steering angle $δ(s)$, shown in expression (4), for example.

[Mathematical 2]

$$\frac{M_Z(s)}{\delta(s)} = \frac{G_\delta^r(0)\dfrac{(\alpha\omega_n)^2(1+T_r s)}{(\alpha\omega_n)^2 + 2\left(\dfrac{\zeta}{\lambda}\right)(\alpha\omega_n)s + s^2} - G_\delta^r(0)\dfrac{\omega_n^2(1+T_r s)}{\omega_n^2 + 2\zeta\omega_n s + s^2}}{G_M^r(0)\dfrac{\omega_n^2(1+T_M s)}{\omega_n^2 + 2\zeta\omega_n s + s^2}} \quad (4)$$

In expression (4), $Gδ^r(0)$ is a yaw angular velocity gain constant (yaw rate gain constant), $ω_n$ is a natural frequency in the yaw direction, ζ is an attenuation coefficient in the yaw direction, Tr is a yaw angular velocity time constant (yaw rate time constant), $GM^r(0)$ is a yaw moment gain constant, $T_M$ is a yaw moment time constant, s is the Laplace operator, α is a control gain of the natural frequency $ω_n$, and λ is a control gain of the attenuation coefficient ζ. The yaw angular velocity gain constant $Gδ^r(0)$, the natural frequency $ω_n$ in the yaw direction, the attenuation coefficient ζ in the yaw direction, the yaw angular velocity time constant Tr, the yaw moment gain constant $GM^r(0)$, and the yaw moment time constant $T_M$ are calculated from the vehicle speed and vehicle parameters such as vehicle mass and wheelbase.

With reference to expression (4), it is found that the yaw moment $M_z(s)$ relative to the actual steering angle $δ(s)$ is zero if the control gains α and λ are 1. The braking/driving torque calculation module 28 determines braking/driving torques for the four wheels on the basis of the acceleration torque command value supplied from the main ECU section 13 and the yaw moment calculated by expression (4), and issues a torque command value Y to the inverter torque command device 16. If no vehicle attitude stabilization control is performed, the torque command value Y is used as a last command torque.

Figure 7:
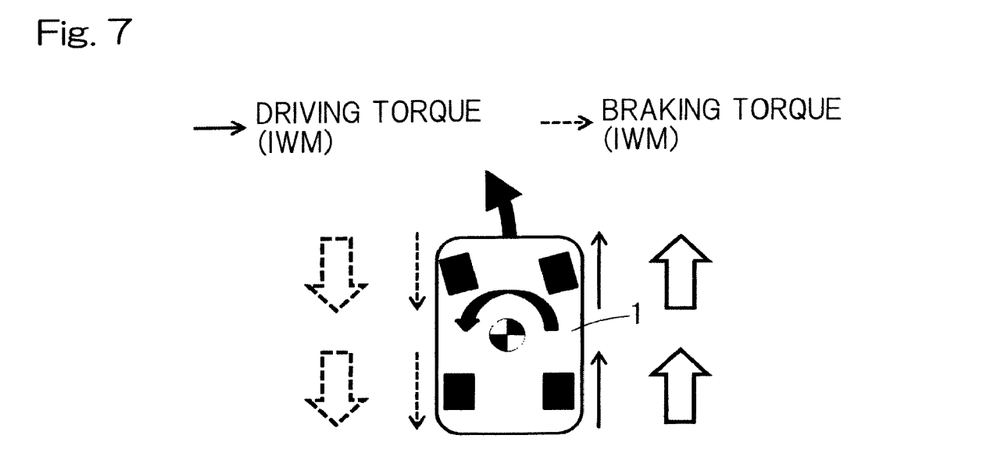
FIG. 7 shows an example in which a yaw moment is generated in such a direction as to improve turning performance, when the vehicle shown in FIG. 1 turns left.

FIG. 7 shows an example in which a yaw moment is generated in such a direction as to improve turning performance when the vehicle 1 is turned left. In FIG. 7, a solid-line thin arrow indicates a driving torque by the driving source. A broken-line thin arrow indicates a braking torque by the driving source (the same applies to FIGS. 11A to 11C). A solid-line thick arrow indicates a total value of driving torques and a broken-line thick arrow indicates a total value of braking torques (the same applies to FIGS. 11A to 11C).

In the vehicle shown in FIG. 7, a yaw moment is generated by developing a driving torque at the turning outer wheels and developing a braking torque at the turning inner wheels. If the driver performs an accelerating operation or a braking operation during turning of the vehicle 1, a driving torque or a braking torque is applied and therefore the vehicle 1 is accelerated or decelerated.

As shown in FIG. 3, the vehicle attitude stabilization control device 15 performs control for stabilizing the attitude of the vehicle. The actual yaw rate is supplied from the main ECU section 13 to the vehicle attitude stabilization control device 15. The vehicle attitude stabilization control device 15 includes a yaw rate deviation calculation module 29, a vehicle attitude state calculation module 30, and a braking/driving torque calculation module 31. The yaw rate deviation calculation module 29 calculates the yaw rate deviation, from a difference between the actual yaw rate and the target yaw rate calculated by the target yaw rate calculation module 25. In other words, the yaw rate deviation calculation module 29 uses the target yaw rate calculated by the target yaw rate calculation module 25, as a target yaw rate in the vehicle attitude stabilization control.

The vehicle attitude state calculation module 30 calculates the attitude state of the vehicle from the magnitude of the yaw rate deviation calculated by the yaw rate deviation calculation module 29.

Figure 8:
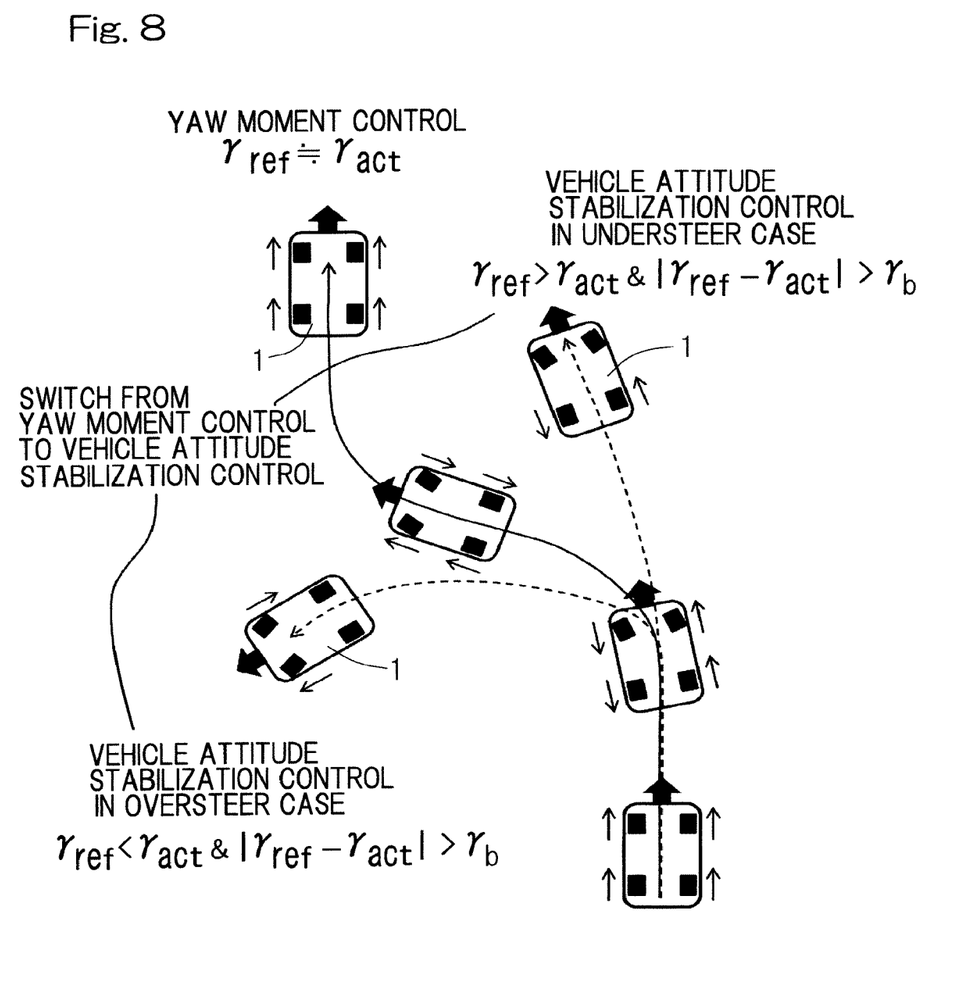
FIG. 8 shows three states of the attitude of the vehicle shown in FIG. 1.

FIG. 8 shows three states of the attitude of the vehicle 1. In the case where the target yaw rate and the actual yaw rate are substantially equal to each other, the above yaw moment control device 14 (FIG. 3) performs the yaw moment control to command braking torques or driving torques in the same direction for the front and rear wheels on one side as shown in FIG. 8, thereby generating a yaw moment.

On the other hand, at a place with a low road surface frictional coefficient, or the like, it is likely that the vehicle fails to take a curve, or spins. Where the target yaw rate is $r_{ref}$, the actual yaw rate is $r_{act}$, and the yaw rate threshold value is $r_b$, the vehicle attitude state calculation module 30 (FIG. 3) determines that the vehicle is in an understeer state if expression (5) is satisfied. The vehicle attitude state calculation module 30 (FIG. 3) determines that the vehicle is in an oversteer state if expression (6) is satisfied. That is, the determination is performed as follows.

Understeer state, if $r_{ref} > r_{act}$ and $|r_{ref} - r_{act}| > r_b$     (5)

Oversteer state, if $r_{ref} < r_{act}$ and $|r_{ref} - r_{act}| > rb$     (6)

A yaw moment is generated using the rear wheels as control wheels in the case of understeer state or using the front wheels as control wheels in the case of oversteer state, whereby the attitude of the vehicle 1 is stabilized.

As shown in FIG. 3, the braking/driving torque calculation module 31 of the vehicle attitude stabilization control device 15 calculates a braking torque and a driving torque on the basis of the road surface frictional coefficient calculated by the road surface frictional coefficient calculation module 24, the vehicle attitude state calculated by the vehicle attitude state calculation module 30, and the target yaw rate calculated by the target yaw rate calculation module 25, so that the calculated braking torque and driving torque are issued as a torque command value E.

The torque command value Y and the torque command value E are supplied to the inverter torque command device 16 which calculates a last torque command value. The inverter torque command device 16 issues the last torque commands value calculated from the torque command value Y and the torque command value E, to the respective inverter devices 11. Each of the inverter devices 11 controls current so as to achieve the last torque command value, thereby driving the in-wheel motor driving device 5.

In the vehicle turning control device described above, the target yaw rate calculation module 25 calculates a target yaw rate for the vehicle 1, from the yaw response characteristic with respect to the vehicle speed and the steering angle. The yaw moment calculation module 27 calculates braking/driving torques for the plurality of wheels 2 on the basis of the target yaw rate, thereby calculating a yaw moment for the vehicle 1. As the estimated road surface frictional coefficient decreases or as the calculated yaw rate deviation increases, the control gain calculation module 26 causes the yaw response characteristic to approach the reference yaw response characteristic from the predetermined yaw response characteristic, which is different from the reference yaw response characteristic. In this way, by changing the yaw response characteristic in accordance with the road surface frictional coefficient or the yaw rate deviation, it is possible to suppress change in the attitude of the vehicle 1 due to the yaw moment control. In addition, even if the control is switched from the yaw moment control to the control for stabilizing the attitude of the vehicle 1, it is possible to prevent uncomfortable feeling from being given to the driver.

When the road surface frictional coefficient is smaller than the road surface frictional coefficient threshold value and/or when the yaw rate deviation is greater than the yaw rate deviation threshold value, the control gain calculation module 26 uses the vehicle reference yaw response characteristic as the yaw response characteristic used in the target yaw rate calculation module 25. Thus, change in the attitude of the vehicle 1 due to yaw moment control is limited to almost zero, when the road surface frictional coefficient is smaller than the road surface frictional coefficient threshold value and/or when the yaw rate deviation is greater than the yaw rate deviation threshold value. Thus, the attitude of the vehicle 1 can be prevented from becoming unstable.

The control gain calculation module 26 is configured such that, when changing the yaw response characteristic used in the target yaw rate calculation module 25 from the reference yaw response characteristic to the predetermined yaw response characteristic, the amount of change in the yaw response characteristic per time is smaller than when changing the yaw response characteristic from the predetermined yaw response characteristic to the reference yaw response characteristic. Therefore, when the yaw response characteristic is changed from the predetermined yaw response characteristic to the reference yaw response characteristic, the attitude of the vehicle 1 can be stabilized immediately, and when the yaw response characteristic is changed from the reference yaw response characteristic to the predetermined yaw response characteristic, uncomfortable feeling can be prevented from being given to the driver.

The yaw response characteristic used in the target yaw rate calculation module 25 is represented by a calculation expression of a second-order lag system of the target yaw rate relative to the actual steering angle, and the yaw response characteristic is changed by changing the gain of the natural frequency in the yaw direction and/or the gain of the attenuation coefficient in the yaw direction included in the calculation expression. In this way, by representing the yaw response characteristic used in the target yaw rate calculation module 25 by a general calculation expression of a second-order lag system, the calculation expression can be simplified. In the calculation expression, the natural frequency and the attenuation coefficient in the yaw direction can be adjusted individually.

The vehicle attitude stabilization control device 15 uses the target yaw rate calculated by the target yaw rate calculation module 25, for the control for stabilizing the attitude of the vehicle 1. Therefore, even if the control is switched from the yaw moment control to the control for stabilizing the attitude of the vehicle 1, the same target yaw rate as that used in the yaw moment control is used and thus the turning characteristic of the vehicle 1 with respect to steering stays unchanged. Therefore, no uncomfortable feeling is given to the driver.

Figure 9:
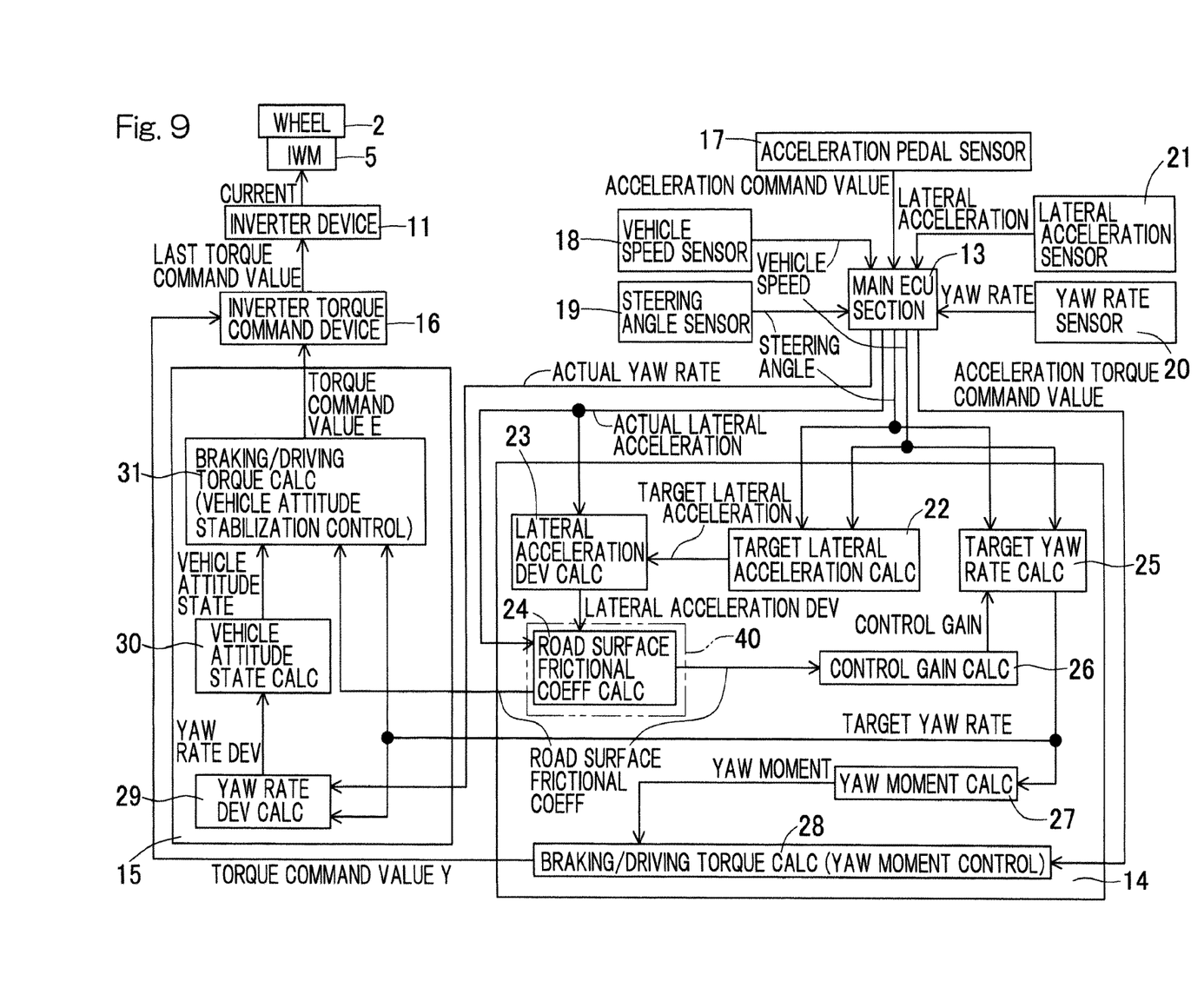
FIG. 9 is a block diagram showing a specific example of a part of a vehicle turning control device according to the second embodiment of the present invention.

The second embodiment will be described. As shown in FIG. 9, the control gain calculation module 26 may calculate the control gain in accordance with only the road surface frictional coefficient calculated by the road surface frictional coefficient calculation module 24, without using the yaw rate deviation. That is, the yaw rate deviation-and/or-road surface friction calculation module 40 includes only the road surface frictional coefficient calculation module 24.

Figure 10:
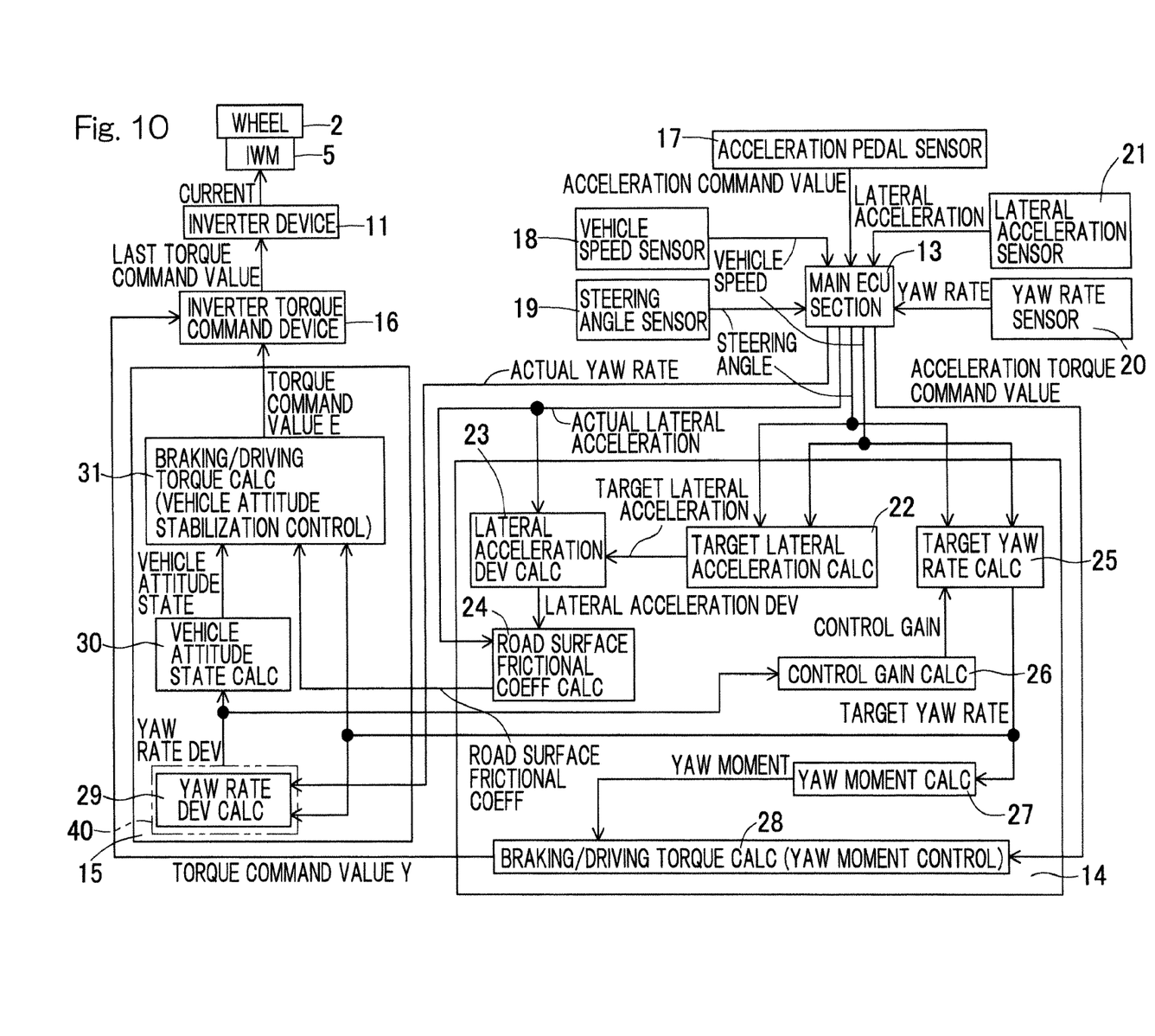
FIG. 10 is a block diagram showing a specific example of a part of a vehicle turning control device according to the third embodiment of the present invention.

As in the third embodiment shown in FIG. 10, the control gain calculation module 26 may calculate the control gain in accordance with only the yaw rate deviation calculated by the yaw rate deviation calculation module 29, without using the road surface frictional coefficient. That is, the yaw rate deviation-and/or-road surface friction calculation module 40 includes only the yaw rate deviation calculation module 29.

The configuration shown in FIG. 9 or FIG. 10 can reduce the calculation processing load of the turning control device as compared to the configuration shown in FIG. 3.

As the vehicle, other than the vehicle including the in-wheel motor driving devices for all four wheels as described above, a vehicle using a friction brake for a braking torque may be applied.

Figure 11A:
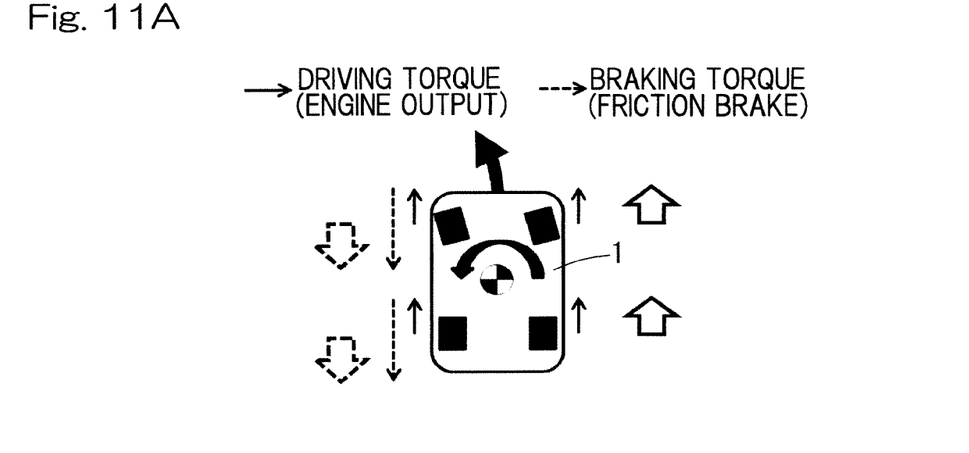
FIG. 11A is a schematic diagram showing an example of a way of driving a four-wheel drive vehicle using an internal combustion engine as a driving source in the case where a yaw moment is generated in such a direction as to improve turning performance when the vehicle turns left.
Figure 11B:
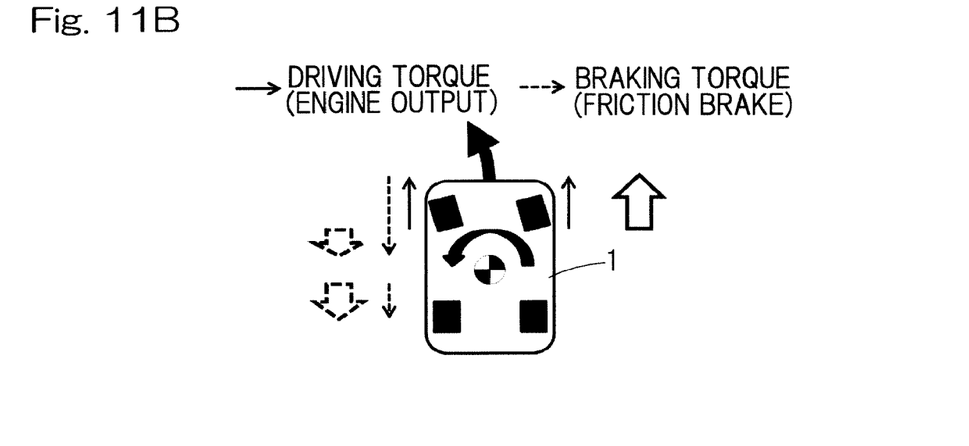
FIG. 11B is a schematic diagram showing an example of a way of driving a front-wheel drive vehicle using an internal combustion engine as a driving source in the case where a yaw moment is generated in such a direction as to improve turning performance when the vehicle turns left.
Figure 11C:
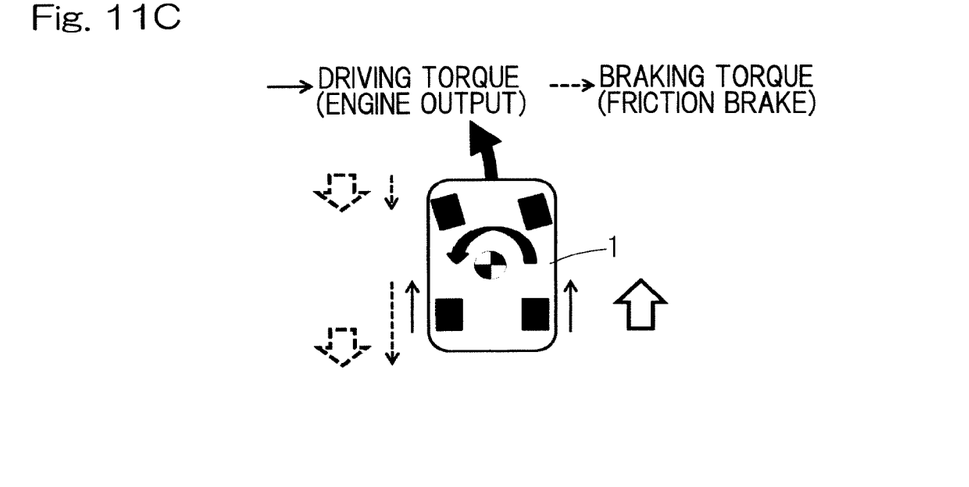
FIG. 11C is a schematic diagram showing an example of a way of driving a rear-wheel drive vehicle using an internal combustion engine as a driving source in the case where a yaw moment is generated in such a direction as to improve turning performance when the vehicle turns left.

FIG. 11A shows a four-wheel drive vehicle using an internal combustion engine as a driving source, FIG. 11B shows a front-wheel drive vehicle having the same driving source, and FIG. 11C shows a rear-wheel drive vehicle having the same driving source, and in each vehicle, the yaw moment control can be performed using a friction brake. In each vehicle 1 in FIGS. 11A to 11C, driving torques by the engine are developed at for the turning outer wheels, and greater braking torques by the friction brakes than the driving torques are developed at the turning inner wheels, whereby a yaw moment is generated.

In the in-wheel motor driving device, a cycloidal speed reducer, a planetary reducer, a speed reducer with two parallel shafts, or other speed reducer may be provided. Alternatively, in-wheel motor driving device may be a so-called direct motor type in which no speed reducer is used.

As the vehicle, the following vehicle may be used: outputs of two motors provided in the vehicle body respectively for the right and left wheels are transmitted to the respective wheels via a drive shaft and the like and braking/driving torques for the wheels are controlled independently.

Although the modes for carrying out the present invention have been described on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . vehicle
2 . . . wheel
4 . . . electric motor (braking/driving source)
18 . . . vehicle speed sensor (vehicle speed detection device)
19 . . . steering angle sensor (steering angle detection device)
20 . . . yaw rate sensor (yaw rate detection device)
24 . . . road surface frictional coefficient calculation module
25 . . . target yaw rate calculation module
26 . . . yaw response characteristic changing module (control gain calculation module)
27 . . . yaw moment calculation module
29 . . . yaw rate deviation calculation module
40 . . . yaw rate deviation-and/or-road surface friction calculation module

What is claimed is:

1. A vehicle turning control device for controlling a turning characteristic of a vehicle, the vehicle including braking/driving sources for independently controlling braking/driving torques applied to a plurality of wheels, a vehicle speed detection device for detecting a vehicle speed, and a steering angle detection device for detecting a steering angle, the vehicle turning control device comprising:
a memory; and
at least one processor coupled to the memory, the at least one processor including:
a target yaw rate calculation module configured to calculate a target yaw rate for the vehicle based on a yaw response characteristic, with respect to the vehicle speed detected by the vehicle speed detection device and the steering angle detected by the steering angle detection device;
a yaw moment calculation module configured to calculate the braking/driving torques developed at the plurality of wheels based on the target yaw rate calculated by the target yaw rate calculation module, so as to calculate a yaw moment predicted to act on the vehicle;
a yaw rate deviation-and/or-road surface friction calculation module including one or both of a yaw rate deviation calculation module configured to calculate a yaw rate deviation, from a difference between the target yaw rate and an actual yaw rate detected by a yaw rate detection device provided to the vehicle, and a road surface frictional coefficient calculation module configured to estimate a road surface frictional coefficient; and
a yaw response characteristic changing module configured to cause the yaw response characteristic used in the target yaw rate calculation module so as to approach a reference yaw response characteristic from a predetermined yaw response characteristic different from the reference yaw response characteristic, as the yaw rate deviation calculated by the yaw rate deviation calculation module increases or as the road surface frictional coefficient estimated by the road surface frictional coefficient calculation module decreases.

2. The vehicle turning control device as claimed in claim 1, wherein
the yaw response characteristic changing module determines a control gain for the yaw response characteristic used in the target yaw rate calculation module, in accordance with one or both of the yaw rate deviation and the road surface frictional coefficient.

3. The vehicle turning control device as claimed in claim 1, wherein
the yaw response characteristic changing module adjusts the yaw response characteristic used in the target yaw rate calculation module to the reference yaw response characteristic, when the road surface frictional coefficient is smaller than a road surface frictional coefficient threshold value or when the yaw rate deviation is greater than a yaw rate deviation threshold value.

4. The vehicle turning control device as claimed in claim 1, wherein
the yaw response characteristic changing module is configured such that, when the yaw response characteristic used in the target yaw rate calculation module is changed from the reference yaw response characteristic to the predetermined yaw response characteristic, an amount of change in the yaw response characteristic per time is smaller than when the yaw response characteristic is changed from the predetermined yaw response characteristic to the reference yaw response characteristic.

5. The vehicle turning control device as claimed in claim 1, wherein
the yaw response characteristic used in the target yaw rate calculation module is represented by a calculation expression of a second-order lag system of the target yaw rate relative to an actual steering angle, and the yaw response characteristic is changed by changing a gain of a natural frequency in a yaw direction and/or a gain of an attenuation coefficient in the yaw direction included in the calculation expression.

6. The vehicle turning control device as claimed in claim 1, wherein
the road surface frictional coefficient calculation module estimates the road surface frictional coefficient from a magnitude of an actual lateral acceleration detected by a lateral acceleration detection device provided to the vehicle when a deviation between a target lateral acceleration and the actual lateral acceleration is greater than a predetermined value.

7. The vehicle turning control device as claimed in claim 1, the at least one processor further comprises a vehicle attitude stabilization control device configured to perform control for stabilizing an attitude of the vehicle, wherein
the vehicle attitude stabilization control device uses the target yaw rate calculated by the target yaw rate calculation module, for the control for stabilizing the attitude of the vehicle.

8. The vehicle turning control device as claimed in claim 1, wherein
the braking/driving sources are electric motors configured to drive the respective wheels.

9. A vehicle turning control device for controlling a turning characteristic of a vehicle, the vehicle including braking/driving sources for independently controlling braking/driving torques applied to a plurality of wheels, a vehicle speed detection device for detecting a vehicle speed, and a steering angle detection device for detecting a steering angle, the vehicle turning control device comprising:
a computer configured to:

calculate a target yaw rate for the vehicle based on a yaw response characteristic, with respect to the vehicle speed detected by the vehicle speed detection device and the steering angle detected by the steering angle detection device;

calculate the braking/driving torques developed at the plurality of wheels based on the calculated target yaw rate, so as to calculate a yaw moment predicted to act on the vehicle;

calculate a yaw rate deviation, from a difference between the target yaw rate and an actual yaw rate detected by a yaw rate detection device provided to the vehicle, and/or estimate a road surface frictional coefficient; and cause the yaw response characteristic so as to approach a reference yaw response characteristic from a predetermined yaw response characteristic different from the reference yaw response characteristic, as the calculated yaw rate deviation increases or as the estimated road surface frictional coefficient decreases.

10. The vehicle turning control device as claimed in claim 9, wherein
the computer is further configured to determine a control gain for the yaw response characteristic, in accordance with one or both of the yaw rate deviation and the road surface frictional coefficient.

11. The vehicle turning control device as claimed in claim 9, wherein
the computer is further configured to adjust the yaw response characteristic to the reference yaw response characteristic, when the road surface frictional coefficient is smaller than a road surface frictional coefficient threshold value or when the yaw rate deviation is greater than a yaw rate deviation threshold value.

12. The vehicle turning control device as claimed in claim 9, wherein
when the yaw response characteristic is changed from the reference yaw response characteristic to the predetermined yaw response characteristic, an amount of change in the yaw response characteristic per time is smaller than when the yaw response characteristic is changed from the predetermined yaw response characteristic to the reference yaw response characteristic.

13. The vehicle turning control device as claimed in claim 9, wherein
the yaw response characteristic is represented by a calculation expression of a second-order lag system of the target yaw rate relative to an actual steering angle, and the yaw response characteristic is changed by changing a gain of a natural frequency in a yaw direction and/or a gain of an attenuation coefficient in the yaw direction included in the calculation expression.

14. The vehicle turning control device as claimed in claim 9, wherein
the computer is further configured to estimate the road surface frictional coefficient from a magnitude of an actual lateral acceleration detected by a lateral acceleration detection device provided to the vehicle when a deviation between a target lateral acceleration and the actual lateral acceleration is greater than a predetermined value.

15. The vehicle turning control device as claimed in claim 9, wherein the computer is further configured to perform control for stabilizing an attitude of the vehicle using the calculated target yaw rate.

16. The vehicle turning control device as claimed in claim 9, wherein
the braking/driving sources are electric motors configured to drive the respective wheels.

* * * * *